United States Patent [19]
Mohr

[11] Patent Number: 5,068,035
[45] Date of Patent: Nov. 26, 1991

[54] COALESCING PLATE PACKING SYSTEM

[75] Inventor: Kirby S. Mohr, Jenks, Okla.

[73] Assignee: Facet Quantek, Inc., Tulsa, Okla.

[21] Appl. No.: 647,501

[22] Filed: Jan. 28, 1991

[51] Int. Cl.⁵ ............................................. C02F 1/40
[52] U.S. Cl. .................................... 210/236; 210/238; 210/522; 210/541; 210/DIG. 5; 55/257.2; 55/257.3; 55/257.6
[58] Field of Search ............... 210/521, 522, 232, 236, 210/238, 541, DIG. 5; 55/257.2, 257.3, 257.6

[56] References Cited

U.S. PATENT DOCUMENTS

| | | | |
|---|---|---|---|
| 386,114 | 7/1888 | Donahue | 210/522 |
| 3,348,466 | 10/1967 | Luse et al. | 55/257.2 |
| 3,454,165 | 7/1969 | Cornelissen | 210/522 |
| 3,957,656 | 5/1976 | Castelli | 210/521 |
| 4,053,292 | 10/1977 | Schneider et al. | 55/257.2 |
| 4,337,562 | 7/1982 | James | 210/521 |
| 4,361,426 | 11/1982 | Carter et al. | 55/257.2 |
| 4,722,800 | 2/1988 | Aymong | 210/521 |
| 4,921,609 | 5/1990 | Fromson | 210/521 |
| 5,028,333 | 7/1991 | Wright et al. | 210/521 |

FOREIGN PATENT DOCUMENTS 2715049 10/1978 Fed. Rep. of Germany.

Primary Examiner—Ivars Cintins
Assistant Examiner—Christopher Upton
Attorney, Agent, or Firm—Head & Johnson

[57] ABSTRACT

A coalescing plate packing system for use in separating immiscible components of different densities mixed in a fluid, the packing system being used in a vessel having a fluid inlet, a lighter component outlet and a heavier components outlet, the packing system being formed of a stack of spaced apart coalescing plate each having orthogonally arranged corrugations running both laterally and longitudinally, a pair of bottom supports each having an undulating upper edge conforming to the lateral corrugations of the coalescing plates, the bottom supports being spaced apart from each other for supporting the coalescing plates, a pair of top supports each having an undulating bottom edge conforming to the lateral configurations of the coalescing plates and positioned directly over and in common vertical planes with the bottom supports and elongated, preferably fiberglass rods extending through the coalescing plates and attached at the ends thereof to the bottom and top supports holding the supports and coalescing plates therebetween in a unitary package for insertion into and removal from a coalescing vessel.

22 Claims, 4 Drawing Sheets

COALESCING PLATE PACKING SYSTEM

BACKGROUND OF THE INVENTION

In today's environment increased emphasis is being placed upon cleaning up and preventing pollution. A common source of pollution is oil mixed with water, due either to accidental spills, leakage, or industrial production. A common means of separating oil and water, or any other two immiscible components of different densities mixed in a fluid, is by coalescence. Coalescence is best achieved when a mixture of different density components is exposed to a material having wetting characteristics that favors either the higher density or the lower density component. A typical coalescing system uses an oleophlic material so that a lighter component, usually oil of one form or another, is attracted to the oleophlic material given the entrained oil component an opportunity to form into larger droplet sizes that will rise to the surface of the mixture.

A structure which has functioned very successfully in coalescing systems is a coalescing plate having bi-directional corrugations that run orthogonally, that is, corrugations that run both laterally and longitudinally along the single plane of the coalescing plate as illustrated and described in U.S. Pat. No. 4,897,206. The bi-directional corrugations form crests and valleys, and the crests and valleys are provided with bleed holes for passage of the immiscible components.

The bi-directionally coalescing plates of U.S. Pat. No. 4,897,206 are stacked in spaced apart arrangement and parallel to each other and arranged for a fluid mixture to flow between the plates. As the mixture flows between the plates the lighter component coalesces into droplets that grow in size until they overcome the tension that normally holds them in suspension in the mixture. The increased size droplets rise to the top of the mixture and are skimmed off, while the higher density component of the mixture, water, is drained from a lower level within the vessel. For the bi-directionally corrugated coalescing plates to function effectively they must be held in a spaced apart relationship, and U.S. Pat. No. 4,987,206 includes integral means for supporting the plates in this arrangement. However, the plates must be assembled in a package within a vessel or pit and arranged so that the mixture flows between the spaced apart plates and not above or below the plates or through spaces between the plates and the vessel walls. In the past the plates have been assembled into a package held together by either steel rods or wire. These two methods have disadvantages. In the wire method stainless steel wires with copper end clips have been used. The disadvantages of this system are that the clips come off and the wire does not have sufficient water corrosion resistance to last. Often the wires corrode completely into two pieces, whereupon the packages disintegrate into their component plates.

If stainless steel rods are used it is necessary to use cut and drill pieces of fiberglass channels at the top of the packs and to use specially formed stainless steel "feet" at the bottom of the pack. Stainless rods and nuts are used to fasten the plates together. The disadvantage of this system is that a great deal of labor is involved in cutting and drilling the channels and because the channels must be parallel to the direction of fluid flow, they cannot constitute a flow block and the plates must extend above the surface of the oil or the lighter component of the mixture. The stainless steel parts of this system are subject to attack by chlorides in the water.

The present disclosure relates to an improved system of packing bi-directional corrugated coalescing plates into a package that is easily inserted into and removed from a vessel and that is formed of components that are not subject to deterioration by water and/or oil. Further, the system of this disclosure provides improved means of ensuring that the flow of the fluid mixture is substantially completely through the spaces between the coalescing plates so as to improve the separation of lighter from heavier components of the mixture.

SUMMARY OF THE INVENTION

This invention relates to a coalescing system for separating immiscible components of different densities mixed in a fluid. The system includes a vessel having a fluid inlet, a lighter component outlet and a heavier component outlet. The vessel has a bottom, opposed end walls, opposed paralleled sidewalls and an open top.

A coalescing package is formed to include a plurality of spaced apart coalescing plates. The coalescing plates have bi-directional corrugations running both laterally and longitudinally along a single plane of the plate. This arrangement forms crests and valleys. Openings are provided in the crests and valleys for the migration of heavier and lighter components within the mixture.

A pair of bottom supports is employed in forming the package. Each bottom support has a flat bottom edge, an undulating upper edge conforming to the lateral corrugations of the coalescing plates, and opposed paralleled sides. The spacing between the bottom plates opposed paralleled sides is slightly less than the spacing between the vessel sidewalls. The bottom supports are spaced apart from each other in paralleled vertical planes to support the coalescing package.

A pair of top supports is employed, each having an upper edge, an undulating bottom edge conforming to the lateral corrugations of the coalescing plates, and opposed paralleled sides. The spacing between the sides is, like that of the lower supports, slightly less than the spacing between the vessel sidewalls. The top supports are spaced apart and positioned directly over the bottom supports in spaced apart vertical planes.

Elongated rods, preferably formed of fiberglass, extend through the coalescing plates and are attached at their lower ends to the bottom supports and at their upper ends to the top supports. This is accomplished by utilizing fiberglass rods threaded at each end that receive nuts thereon.

The coalescing package is assembled by placing the stack of coalescing plates on the spaced apart bottom supports and with the top supports arranged in vertical planes over the bottom supports. Rods extend through the top supports, through the stack of coalescing plates and through the bottom supports. Nuts are then attached to each end of the rods. The coalescing package can then be installed as a unit into a vessel.

In a preferred arrangement means is provided to reduce the possibility of flow of the mixture along either side of the vessel. This is achieved by the provision of semi-circular vertical grooves in each end of the top and bottom supports. Similar semi-circular cutouts are provided in the coalescing plates. By use of a tube, that can be a length of rigid plastic tube, or more preferably, a length of compressible plastic or rubber tube, inserted between the ends of the top and bottom supports and the vessel side wall, the possibility of the flow of fluid mixture bypassing the coalescing plates is substantially reduced.

A better understanding of this invention will be had by reference to the following description and claims, taken in conjunction with the attached drawings.

DESCRIPTION OF THE PREFERRED EMBODIMENT

Figure 1:
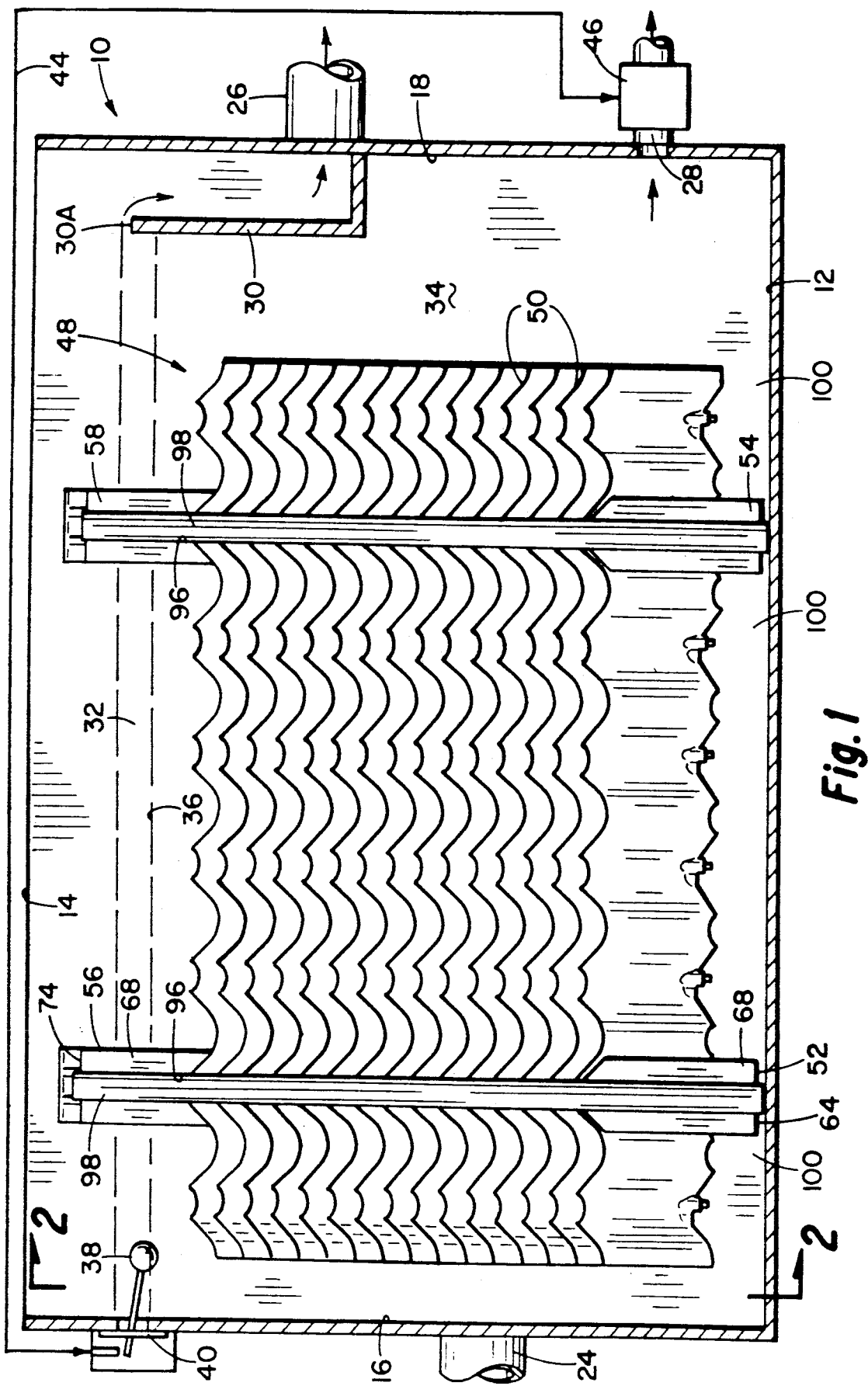
FIG. 1 is an elevational cross-sectional view of a vessel used for separating a heavier from a lighter component of a fluid mixture, such as oil from water, and showing the use in the vessel of a coalescing package formed of a plurality of spaced apart bi-directionally corrugated coalescing plates and with bottom and top supports arranged to assemble the package into a unitary package that can be inserted into and removed from the vessel.
Figure 2:
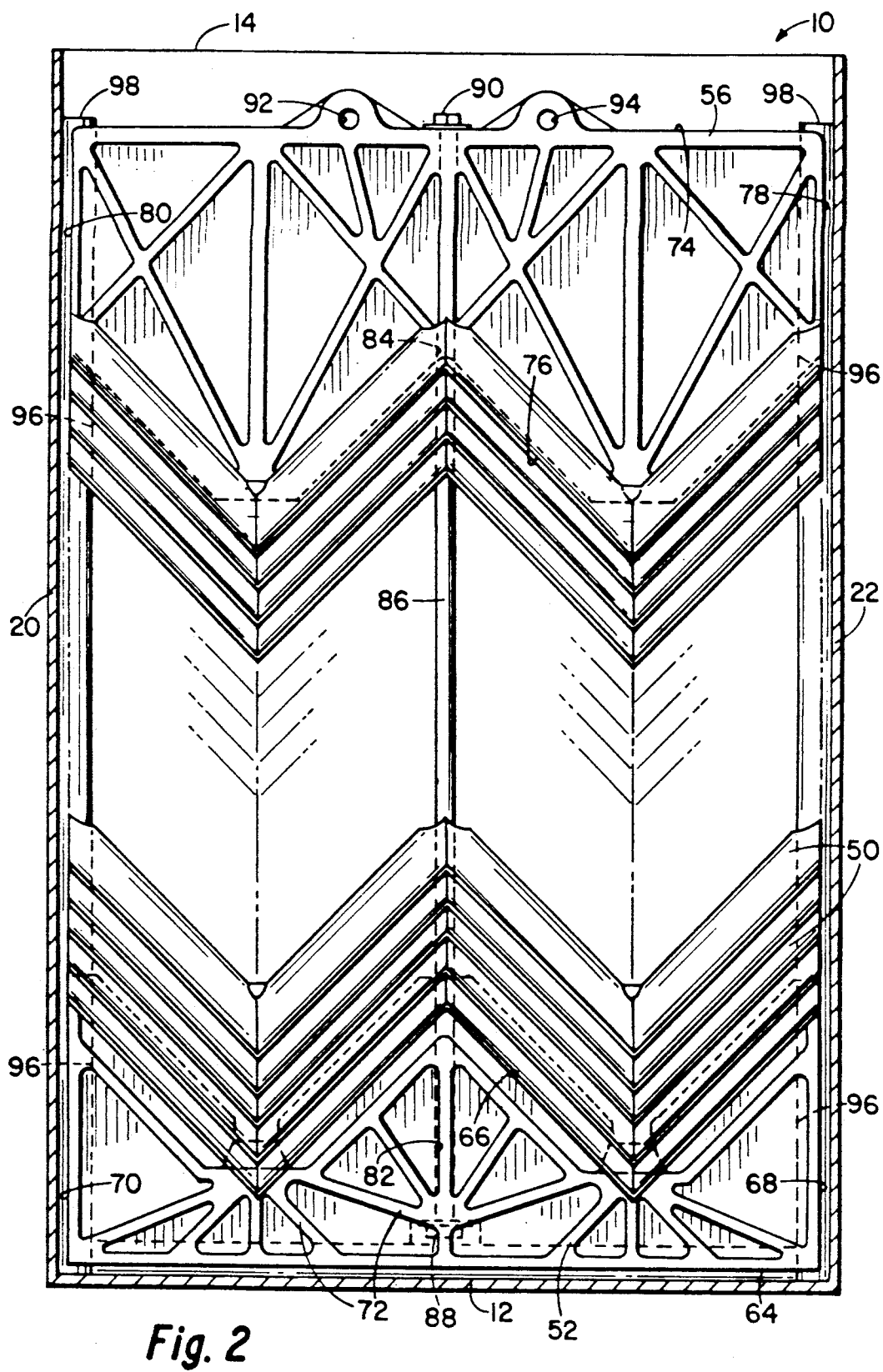
FIG. 2 is an elevational cross-sectional view taken along the line 2—2 of FIG. 2 showing the top and bottom supports with the stack of coalescing plates therebetween and showing the means for attaching the top and bottom supports with an elongated vertical rod to thereby form a coalescing package.

Referring to the drawings and first to FIGS. 1 and 2, a system for separating immiscible heavier and lighter components of a fluid mixture is illustrated. The system includes a vessel 10 having a bottom 12, an open top 14 (that could receive a removable closure if desired), paralleled end walls 16 and 18, and paralleled sidewalls 20 and 22 (see FIG. 2). Vessel 10 has a mixture inlet 24, a lighter component outlet 26 and a heavier component outlet 28. A weir 30 provides a means of skimming off lighter components, such as oil. While the system can be used to separate immiscible heavier and lighter components of a variety of liquids, the typical use is to separate oil and water as illustrated. The system is shown in which the lighter component is oil that accumulates on the top of the mixture and flows over the top edge 30A of weir 30 into the lighter component outlet 26, whereas water 34 accumulates in the lower portion of the vessel. The interface between the lighter component, oil, and the heavier component, water, is indicated by the numeral 36. Means is provided for maintaining interface 36 at a preselected level below top edge 30A of weir 30. One means is by use of an interface detector that can be in the form of a float 38 extending into the interior of the vessel through a diaphragm 40. Float 38 senses the level of interface 36, and by means of a control system, such as by a pneumatic line 44 to a control valve 46, water 34 is drained from the vessel as required to maintain interface level 36. The method of maintaining interface level 36 is by way of example only and is not related to the invention, but is simply illustrated and given as background of one example of an environment in which the invention of this disclosure can be utilized. Many other systems, methods and apparatuses exist for maintaining interface level 36 within vessel 10.

To enhance the separation of lighter from heavier components of a mixture, a coalescing package, generally indicated by the numeral 48, is employed. The coalescing package 48 is preferably assembled as a unit outside of vessel 10 and placed as a unit into or removed from the interior of the vessel. This invention is concerned with the assembly and support of coalescing package 48.

The coalescing package 48 includes: a plurality of coalescing plates 50, which will be described in greater detail subsequently; a pair of bottom supports 52 and 54 that stand uprightly in spaced apart parallel planes; a pair of top supports 56 and 58 that are placed in vertical planes above bottom supports 52 and 54 respectively; means to retain these elements as a unitary package, which will be described subsequently; and means of sealing the package against other packages and/or the vessel sidewalls, which also will be explained in detail.

Figure 4:
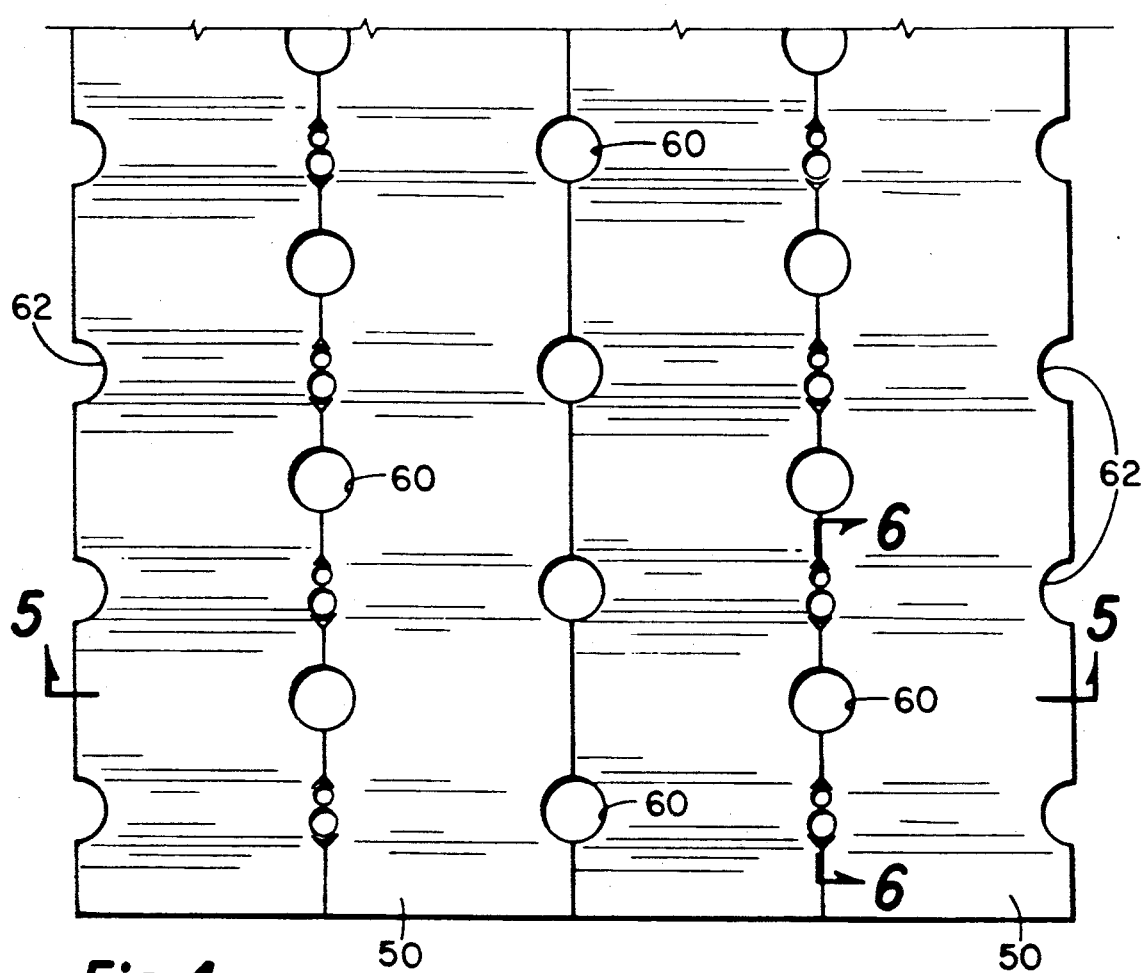
FIG. 4 is an enlarged top view of the coalescing plate. The coalescing plate is of the type having orthogonally arranged corrugations running both laterally and longitudinally along a single plane of the plate forming crests and valleys.
Figure 6:
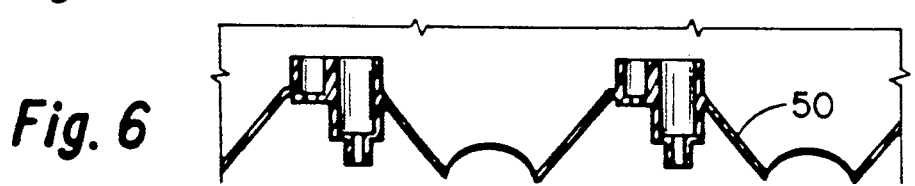
FIG. 6 is an enlarged partial cross-sectional view taken along the line 6—6 of FIG. 4 and showing the structures in the plates used for holding the plates in spaced apart relationship and showing the openings in the plates for the passage of components of the fluid mixture therethrough.
Figure 5:
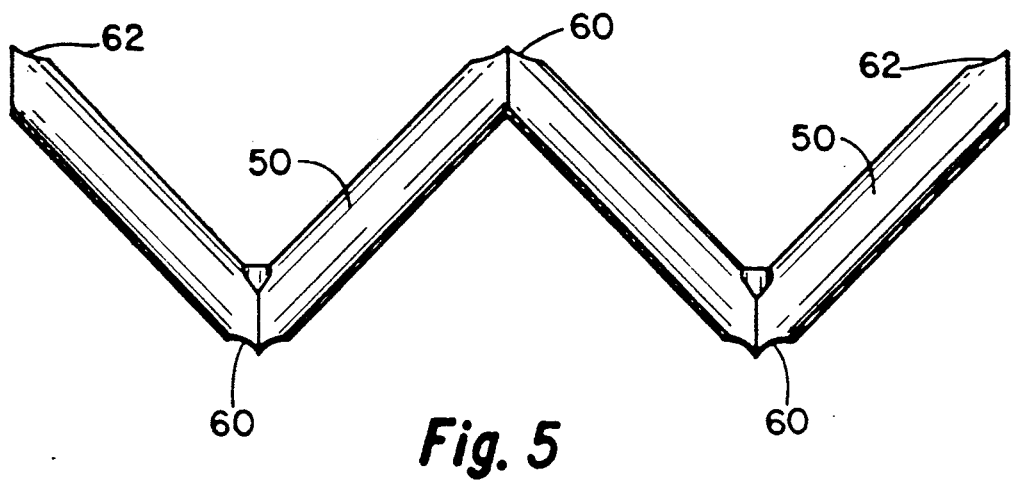
FIG. 5 is a cross-sectional view taken along the line 5—5 of FIG. 4 showing the lateral corrugations in the coalescing plate.

In order to understand in greater detail the coalescing package 48 the structure of coalescing plates 50 needs to be understood and reference is best had to FIGS. 4, 5 and 6. The coalescing plates 50, as employed in this invention, are of the type described and illustrated in complete detail in U.S. Pat. No. 4,897,206, issued Jan. 30, 1990 and entitled "Bidirectionally Corrugated Plate Separator For Fluid Mixtures." U.S. Pat. No. 4,897,206 is incorporated herein by reference.

Each of the coalescing plates 50 has orthogonally structured corrugations running both laterally and longitudinally along a single plane of the plate. This arrangement provides plates with crests and valleys. Openings 60 are provided in the valleys and crests, and semi-circular openings 62 are provided in the edges. The semi-circular openings 62 register to provide openings in the crest of the lateral corrugations when plates are joined contiguous to each other. The openings 60 formed in the lateral valleys of the corrugated plates 50 permit heavier liquid component (water) and particulate matter to pass through the plates in vertical downward migration. Openings 60 in the crests permit the lighter component (oil) to migrate vertically upwardly.

FIG. 2 shows details, in elevational view, of a bottom support 52 and a top support 56. In the illustrated arrangement the supports are preferably molded of plastic material. While metal can be used, plastic has great advantages including: lightness of weight; economy; and inertness. The supports 52 and 56, which are identical respectively to corresponding supports 54 and 58, are used in an upright arrangement and spaced apart parallel planes.

Bottom support 52 has a bottom edge 64 that is preferably flat or at least of a configuration to substantially conform to the vessel bottom 12. Bottom support 52 further has an upper edge 66 that corresponds to the lateral corrugation of coalescing plates 50. The perimeter of bottom support 52 is completed by opposed paralleled sides 68 and 70. The spacing between sides 68 and 70 is slightly less than the spacing between the vessel sidewalls 20 and 22.

Bottom support 52 is, as previously stated, preferably molded of plastic and to reduce the weight thereof has integral reenforcing ribs 72 that can be arranged in a variety of different configurations to add strength to the structure. Bottom support 52 is closed, that is, fluid cannot flow through it as there are no openings between ribs 72.

Top support 56 is, like the bottom support, preferably molded of plastic material and has a top edge 74 that may preferably be generally flat as indicated, although the top edge is not required to conform to a specific configuration. A bottom edge 76 is undulating to conform to the lateral corrugation of coalescing plates 50 and is substantially a mirror of the bottom support top edge 66. Top support 56 further has opposed sides 78 and 80 that are parallel to each other and spaced apart a width that is slightly less than the width of vessel sidewalls 20 and 22.

Bottom support 52 has a small diameter vertical passageway 82 therein that is centrally located between sides 68 and 70. In like manner, top support 56 has a vertical passageway 84 equally spaced between sides 78 and 80. The passageways 82 and 84 are in vertical alignment with each other. Openings 82 and 84 receive an elongated rod 86 that preferably has a threaded portion adjacent each end. While rod 86 may be made of metal, a preferred arrangement is to form rod 86 of an inert material, such as fiberglass. A rod 86 is used for each pair of top and bottom supports. By means of nuts 88 and 90 the rods secure the stack of coalescing plates 50 between the opposed pairs of bottom supports 52 and 54 and top supports 56 and 58 in a unitary package. Thus, the coalescing package 48 may be assembled and then installed directly into vessel 10 and also may be removed as a package from the vessel through vessel top 14. To assist in installation or removal, top supports 56 and 58 are each provided with integral lifting eyes 92 and 94 that are spaced equal distance apart from vertical opening 84 in each of the top supports.

Figure 3:
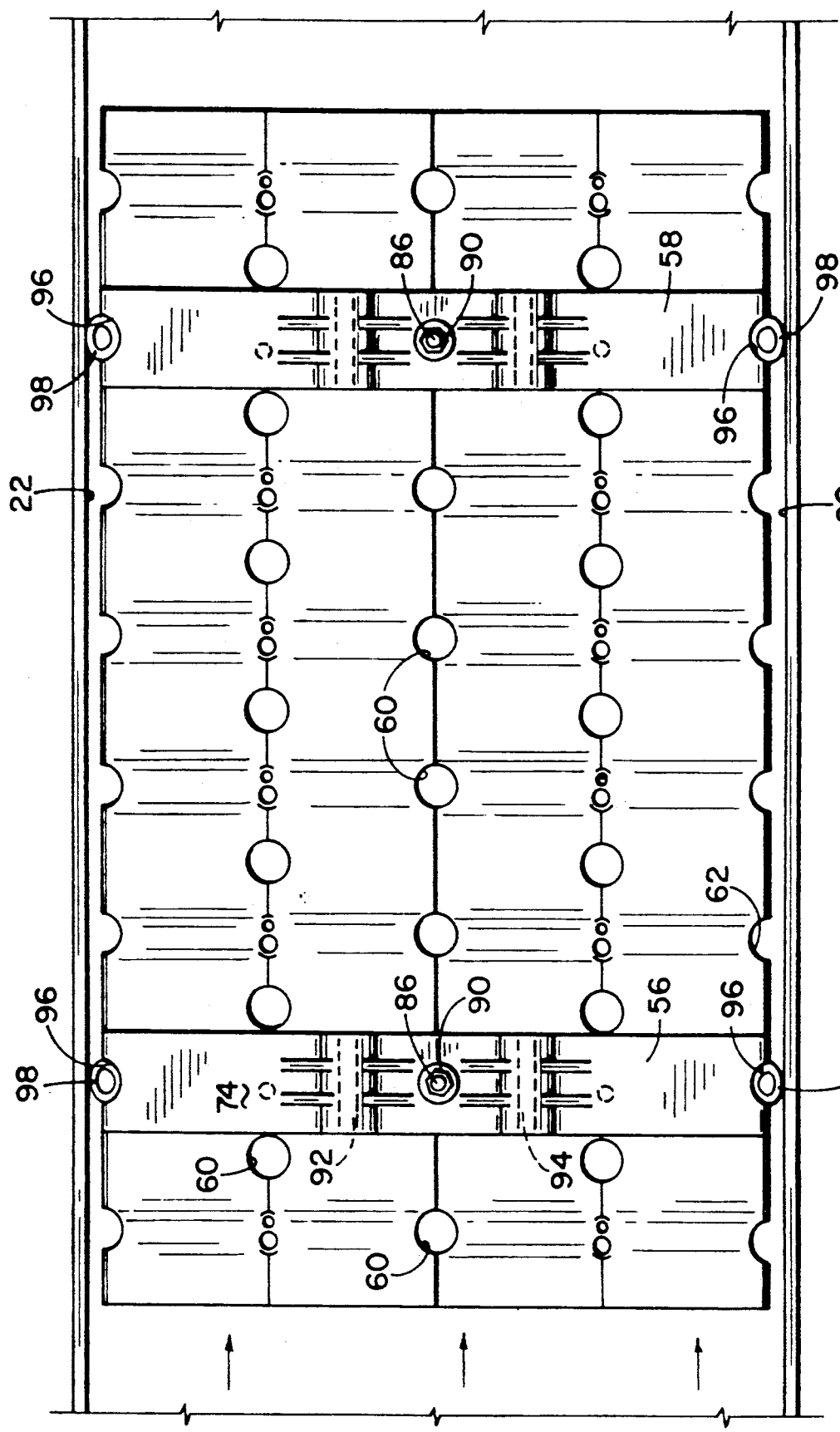
FIG. 3 is a partial plane view of the vessel of FIG. 1, the ends of the vessel not being shown, and showing the top supports and the coalescing plates.

As best seen in FIGS. 1, 2 and 3, top supports 56 and 58 each have semi-circular recesses 96 at their opposed sides 78 and 80. Recesses 96 coincide in alignment with the coalescing plates semi-circular openings 62. The recesses 96 in the top and bottom supports and semi-circular opening 62 in the coalescing plates receive tubes 98 which may be of plastic, and which may be rigid, semi-rigid or may be compressible. In the embodiment illustrated in FIG. 3 tubes 98 are compressible. Tubes 98 may be inserted into the aligned semi-circular openings in the top and bottom coalescing supports after package 48 is inserted into vessel 10 and serve to reduce the flow of mixture past the top and bottom supports to thereby concentrate the flow of fluid mixture through the spaces between the stacked coalescing plates. Flexible tubing may be used, with holes near the ends. The tubing may then be wrapped partially around the pack, with the tubing secured by putting the ends of rods 86 through the holes and using the rod nuts 90 to secure the tubing.

The use of a coalescing package as illustrated and described herein in conjunction with a coalescing system has many advantages over the prior arrangement by which the coalescing plates 50 were previously assembled. The package is easily assembled exterior of the vessel with a minimum amount of labor requirement and when assembled is structurally sound. The package is preferably formed all of non-metallic components that are not subject to deterioration in the presence of water.

As above indicated, open top 14 can receive a closure and, in addition, vessel 10 may be a pressure vessel in which case a closure (not shown) is installed in pressure tight relationship with the vessel after the coalescing package 48 is installed.

Bottom supports 52 and 54 hold coalescing plates 50 above the vessel bottom 12. This leaves areas 100 (see FIG. 1) below the coalescing plates in which particulate matter, such as dirt, sand, rust, etc., may collect. As previously stated, particulate matter can pass downwardly through openings 60 in the valleys of the coalescing plates, and the provision of space 100 permits a substantial volume of solids to collect without intefering with fluid flow between the plates.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A coalescing system for separating immiscible components of different densities mixed in a fluid comprising:

a vessel having a fluid inlet, a lighter component outlet and a heavier component outlet, the vessel having a bottom, opposed end walls, opposed paralleled sidewalls and an open top;

a coalescing stack formed of a plurality of vertically spaced apart coalescing plates positioned within said vessel, each coalescing plate having bi-directional corrugations running both laterally and longitudinally along the single plane of the plate forming crests and valleys, the crests and valleys including bleed holes for passage of the immiscible components;

a pair of bottom supports each having a flat bottom edge, an undulating upper edge conforming to said lateral corrugations of said coalescing plates, and having opposed paralleled sides, the spacing therebetween being slightly less than the spacing between said vessel sidewalls, the bottom supports being spaced apart from each other within said vessel and supporting said coalescing stack;

a pair of top supports each having an upper edge and an undulating bottom edge conforming to said lateral corrugations of said coalescing plates, and having opposed paralleled sides, the spacing between the sides being slightly less than the spacing between said vessel sidewalls, the top supports being spaced apart and positioned directly over said bottom supports in spaced apart planes; and means of retaining said bottom supports, said coalescing stack and said top supports in an assembled package for insertion into and removal from said vessel.

2. A coalescing system according to claim 1 wherein each said bottom support and each said top support has a vertical opening therein and wherein said means of retaining said bottom supports, said coalescing stack and said top supports in an assembled package includes a pair of elongated vertical, spaced apart rods having retainer means on the top and bottom ends thereof, the rods being received in the top and bottom supports vertical openings and passing through said plates forming said coalescing stack.

3. A coalescing system according to claim 2 wherein said rods are made of fiberglass.

4. A coalescing system according to claim 2 wherein at least one end portion of each of said rods is threaded and wherein at least one said retainer means for each said rod is an internally threaded nut.

5. A coalescing system according to claim 2 wherein said vertical openings in each of said bottom and top supports is positioned midway between said supports parallel sides.

6. A coalescing system according to claim 5 wherein said upper edge of each said top support has a first and a second integrally formed lifting eye spaced equally distance from and on opposite sides of said vertical opening.

7. A coalescing system according to claim 1 including:
   seal means interposed between said vertical bottom and top supports sides and said vessel sidewalls whereby the flow of fluid past said supports is restricted to thereby cause fluid to flow substantially only between said coalescing plates.

8. A coalescing system according to claim 7 wherein each of said sides of each of said top supports and bottom supports has a groove therein and wherein said seal means comprises lengths of tubing received in said grooves, each length of tubing being in substantial engagement with a said vessel sidewall.

9. A coalescing system according to claim 8 wherein each said length of tubing is flexible and compressibly engages said top and bottom supports within said grooves and a said vessel sidewall.

10. A coalescing system according to claim 1 wherein said top and bottom supports are molded of plastic.

11. A coalescing system according to claim 1 wherein said upper edge of each said top support has at least one integrally formed lifting eye therein.

12. For use in a coalescing system for separating immiscible components of different densities mixed in a fluid, the system including a vessel having a fluid inlet, a lighter component outlet and heavier component outlet, a coalescing package for insertion into and removal from the vessel comprising:
   a coalescing stack formed of a plurality of vertically spaced apart coalescing plates, each coalescing plate having orthogonally arranged corrugations running both laterally and longitudinally along the single plane of the plate forming crests and valleys, the crests and valleys including bleed holes for passage of the immiscible components;
   a pair of bottom supports each having a bottom edge, an undulating upper edge conforming to said lateral corrugations of said coalescing plates and having opposed sides, the bottom supports being spaced apart from each other in vertical planes and supporting said coalescing stack;
   a pair of top supports each having an upper edge and undulating bottom edge conforming to said lateral corrugations of said coalescing plates and having opposed sides, the top supports being spaced apart and positioned directly over said bottom supports in spaced apart vertical planes; and
   means of retaining said bottom supports, said coalescing stack and said top supports in an assembled package for insertion into and removal from a vessel.

13. A coalescing package according to claim 12 wherein each said bottom support and each said top support has a vertical opening therein and wherein said means of retaining said bottom supports, said coalescing stack and said top supports in an assembled package includes a pair of elongated vertical, spaced apart rods having retainer means on the top and bottom ends thereof, the rods being received in the top and bottom supports vertical openings and passing through said plates forming said coalescing stack.

14. A coalescing package according to claim 13 wherein said rods are made of fiberglass.

15. A coalescing package according to claim 13 wherein at least one end portion of each of said rods is threaded and wherein at least one said retainer means for each said rod is an internally threaded nut.

16. A coalescing package according to claim 13 wherein said vertical openings in each of said bottom and top supports is positioned midway between said supports parallel sides.

17. A coalescing package according to claim 16 wherein said upper edge of each said top support has a first and a second integrally formed lifting eye spaced equally distance from and on opposite sides of said vertical opening.

18. A coalescing package according to claim 12 including:
   seal means received on said vertical bottom and top supports sides.

19. A coalescing package according to claim 18 wherein each of said sides of each of said top supports and bottom supports has a groove therein and wherein said seal means comprises lengths of tubing received in said grooves.

20. A coalescing system according to claim 19 wherein each said length of tubing is flexible.

21. A coalescing package according to claim 12 wherein said top and bottom supports are molded of plastic.

22. A coalescing package according to claim 12 wherein said upper edge of each said top support has at least one integrally formed lifting eye therein.

* * * * *